United States Patent [19]

Tokuyama

[11] Patent Number: 4,514,668
[45] Date of Patent: Apr. 30, 1985

[54] D.C. MOTOR DRIVING CIRCUIT

[75] Inventor: Yoshio Tokuyama, Yokohama, Japan

[73] Assignee: Victor Company of Japan, Ltd., Yokohama, Japan

[21] Appl. No.: 503,630

[22] Filed: Jun. 13, 1983

[30] Foreign Application Priority Data

Jun. 15, 1982 [JP] Japan .............................. 57-88889[U]

[51] Int. Cl.³ .............................................. H02P 1/22
[52] U.S. Cl. ................... 318/294; 318/345 B; 318/345 F
[58] Field of Search ............ 318/301, 308, 331, 345 B, 318/345 F, 430, 431, 674, 453, 293, 294, 264, 445, 272, 277, 393, 395, 394

[56] References Cited

U.S. PATENT DOCUMENTS

| | | | |
|---|---|---|---|
| 3,309,597 | 3/1967 | Gabor et al. | 318/393 |
| 3,378,699 | 4/1968 | Bruinsma et al. | 318/293 X |
| 3,480,849 | 11/1969 | Thornsen et al. | 318/294 X |
| 3,496,441 | 2/1970 | Heider et al. | 318/294 X |
| 3,538,353 | 11/1970 | Hanger | 318/345 F X |
| 3,706,020 | 12/1972 | Klang | 318/400 X |

Primary Examiner—Ulysses Weldon
Attorney, Agent, or Firm—Posnack, Roberts, Cohen & Spiecens

[57] ABSTRACT

A D.C. motor driving circuit comprises a first transistor circuit comprising an initial stage transistor and a terminal stage transistor respectively connected in Darlington pairs, for supplying a current to a D.C. motor, coupled between the D.C. motor and a power source, a switching transistor coupled to the initial stage transistor of the first transistor circuit, and a second transistor circuit including a transistor coupled in parallel to the first transistor circuit, for supplying a current to the D.C. motor. The switching transistor is turned ON when applied with a driving signal voltage to put the first transistor circuit in an ON state. The current supplied to the D.C. motor decreases as a rotational speed thereof increases after starting of the D.C. motor. The first transistor circuit is turned OFF when the rotational speed of the D.C. motor reaches a speed near its constant normal rotational speed. The D.C. motor is supplied with the current from the second transistor circuit during constant normal rotation thereof.

5 Claims, 3 Drawing Figures

D.C. MOTOR DRIVING CIRCUIT

BACKGROUND OF THE INVENTION

The present invention generally relates to D.C. motor driving circuits, and more particularly to a D.C. motor driving circuit having a circuit construction such that the D.C. motor can be driven with small power consumption.

A conventional circuit for driving a D.C. motor comprises conventional driving circuit having a circuit construction in transistors connected in Darlington pairs, as will be described hereinafter in conjunction with the accompanying drawings. However, in this conventional driving circuit, current constantly flows through the transistors connected in Darlington pairs as will be described hereinafter, and there was a disadvantage that the power consumption is large.

When the D.C. motor is used as a capstan motor a recording and/or reproducing apparatus such as a tape recorder and a video tape recorder and the recording and/or reproducing apparatus is designed as a portable type which is driven by a battery, the large power consumption of the D.C. motor is a serious disadvantage since this will lead to shorter serviceable life of the battery.

SUMMARY OF THE INVENTION

Accordingly, it is a general object of the present invention to provide a novel and useful D.C. motor driving circuit in which the above described disadvantages have been eliminated.

Another and more specific object of the present invention is to provide a D.C. motor driving circuit having a circuit construction in which a transistor for supplying a medium current to the D.C. motor is coupled in parallel to transistors which are connected in Darlington pairs for supplying a large current to the D.C. motor. According to the driving circuit of the present invention, the large current flows through the D.C. motor upon starting of the D.C. motor, and the medium current flows through the D.C. motor during steady state rotation of the D.C. motor. Thus, compared to the conventional circuit in which the large current constantly flows through the D.C. motor, the power consumption is small according to the present invention. Hence, the present invention is especially effective when applied to a portable type recording and/or reproducing apparatus which is driven by a power source such as a battery, because it becomes possible to extend the serviceable life of the battery.

Other objects and further features of the present invention will be apparent from the following detailed description when read in conjunction with the accompanying drawings.

DETAILED DESCRIPTION

Figure 1:
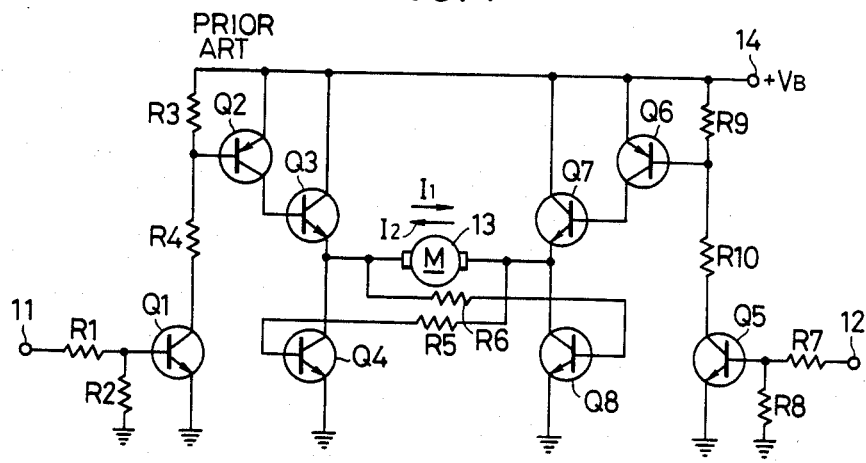
FIG. 1 is a circuit diagram showing an example of a conventional D.C. motor driving circuit.

First, description will be given with respect to an example of a conventional D.C. motor driving circuit by referring to FIG. 1.

A voltage applied to an input terminal 11 is divided by resistors R1 and R2, and then applied to the base of an NPN type transistor Q1. Resistors R3 and R4 and connected in series between the collector of the transistor Q1 and a power source terminal 14. A connection point between the resistors R3 and R4 is connected to the base of a PNP type transistor Q2. The collector of the transistor Q2 is connected to the base of an NPN type transistor Q3, and the transistors Q2 and Q3 are connected in a Darlington pair. The emitter of the transistor Q2 and the collector of the transistor Q3 are respectively connected to the power source terminal 14. The emitter of the transistor Q3 is connected to one terminal of a D.C. motor 13 and to the collector of an NPN type transistor Q3. The emitter of the transistor Q4 is also connected to the base of an NPN type transistor Q8 through a resistor R6. On the other hand, the emitter of an NPN type transistor Q5 is grounded, and the base of transistor Q5 is connected to an input terminal 12, through a voltage divider constituted by resistors R7 and R8. Further, the collector of the transistor Q5 is connected to the voltage source terminal 14, through a series connection of resistors R9 and R10. A connection point between the resistors R9 and R10 is connected to the base of a PNP type transistor Q6. The collector of the transistor Q6 is connected to the base of an NPN type transistor Q7, and transistors Q6 and Q7 are connected in a Darlington pair. The emitter of the transistor Q6 and the collector of the transistor Q7 are respectively connected to the power source terminal 14. The emitter of the transistor Q7 is connected to the other terminal of the motor 13 and to the collector of the transistor Q8. The emitter of the transistor Q7 is also connected to the base of the transistor Q4 through a resistor R5.

When rotating the motor 13 in a forward direction, a high-level voltage is applied to the input terminal 11, and a low-level voltage is applied to the input terminal 12. In this state, the transistor Q1 is turned ON, while the transistor Q5 is turned OFF. When the transistor Q1 is turned ON, a collector current flows through the transistor Q1, and a voltage is accordingly applied to the base of the transistor Q2. As a result, the transistor Q2 is turned ON, and the transistor Q3 is also turned ON as the transistor Q2 is turned ON. Hence, a current is supplied to the base of the transistor Q8, to turn the transistor Q8 ON. In addition, because a low-level voltage is applied to the input terminal 12, the transistor Q5 is in the OFF state, and the transistors Q6 and Q7 thus remain in their OFF states. Moreover, as the transistor Q8 is turned ON, the base potential of the transistor Q4 assumes a level near ground level, and the transistor Q4 is accordingly turned OFF. Therefore, a current flows through the motor 13 in a direction indicated by an arrow $I_1$, to rotate the motor 13 in the forward direction.

On the other hand, when rotating the motor 13 in a reverse direction, a low-level voltage is applied to the input terminal 11 and a high-level voltage is applied to the input terminal 12. In this state, the transistor Q1 is turned OFF, while the transistor Q5 is turned ON. Accordingly, contrary to the above case where the motor 13 is rotated in the forward direction, the transistors Q2, Q3, and Q8 are respectively turned OFF, and the transistors Q6, Q7, and Q4 are respectively turned ON. As a result, a current flows through the motor 13 in a direction indicated by an arrow $I_2$, to rotate the motor 13 in the reverse direction.

As is well known, if the voltage applied to the motor 13 is represented by V [V], the armature resistance by $R_M[\Omega]$, the rotational speed of the motor 13 by N [rpm], a constant by K, and a current flowing through the motor 13 by $I_M$ [A], the current $I_M$ can be described by the equation $(V - K.N)/R_M$. Thus, as clearly seen from this equation, only a medium current (100 [mA], for example) needs to flow through the motor 13 during steady state rotation of the motor 13, however, a large current (1 [A], for example) needs to flow through the motor 13 upon starting of the motor 13. For this reason, the transistors Q2 and Q3 and the transistors Q6 and Q7 are respectively connected in Darlington pairs, and the resistances of the resistors R4 and R10 are selected so that the large current flows through the motor 13 upon starting of the motor 13.

However, in the conventional circuit described heretofore, the transistors Q2 and Q3 (or the transistors Q6 and Q7) connected in the Darlington pair are respectively turned ON during the steady state rotation of the motor 13. Thus, the large current continues to flow through the motor 13 even during the steady state rotation of the motor 13, and there is a disadvantage that the power consumption is large.

The present invention has eliminated the above disadvantage of the conventional driving circuit, and description of a first embodiment of a D.C. motor driving circuit according to the present invention will now be described in conjunction with FIG. 2. In FIG. 2, those parts which are the same as those corresponding parts in FIG. 1 will be described by the same reference numerals, and their description will be omitted.

In the circuit according to the present invention, a circuit part 20 identified by dotted lines in FIG. 2 is provided. The circuit part 20 comprises a PNP type transistor Q10 and resistors R11 and R12. The emitter of the transistor Q10 is connected to the emitter of the transistor Q2 connected in the Darlington pair with the transistor Q3, the collector of the transistor Q3, and the power source terminal 14. The collector of the transistor Q10 is connected to the emitter of the transistor Q3. That is, the transistor Q10 is connected in parallel to the transistors Q2 and Q3 which are connected in the Darlington pair. In addition, thwe base of the transistor Q10 is connected to a connection point between the base biasing resistors R11 and R12. The other end of the resistor R12 is connected to the collector of the transistor Q1.

The transistors Q2 and Q3 connected in the Darlington pair are used for the flow of the large current to the motor 13 upon starting of the motor 13. On the other hand, the transistor Q10 is used for supplying medium current to the motor 13 upon steady state rotation of the motor 13.

When the motor 13 is rotated in the forward direction, a high-level voltage is applied to the input terminal 11 and a low-level voltage is applied to the input terminal 12. In this state, as in the case of the circuit shown in FIG. 1, the transistors Q1, Q2, Q3, and Q8 are turned ON, while the transistors Q5, Q6, Q7, and Q4 are turned OFF. Further, upon starting of the motor 13, the emitter-collector voltage of the transistor Q10 assumes a voltage in the range of 0.8 [V] as the transistors Q2 and Q3 are turned ON. Thus, a collector voltage in accordance with this emitter-collector voltage of the transistor Q10, is supplied to the motor 13. As one example, it will now be assumed that a current I flowing to the motor 13 from the transistors Q2 and Q3 which are turned ON upon starting of the motor 13 is equal to 1 [A], the current amplifications $h_{fe1}$ and $h_{fe2}$ of the transistors Q2 and Q3 are respectively equal to 50, and the power source voltage $V_B$ is equal to 10 [V]. In this case, the base current $I_{B1}$ of the transistor Q2 can be described by the following equation (1).

$$I_{B1} = I/(h_{fe1} \times h_{fe2}) = 1/(50 \times 50) = 0.4 \text{ [mA]} \quad (1)$$

Hence, if sufficient margin is taken into consideration and the base current $I_{B1}$ of 1 [mA] is supplied, the resistance of the resistor R4 becomes equal to 10 [kΩ] (= 10 [V]/1 [mA]).

When the motor 13 is started and begins to rotate in the forward direction, the current flowing through the motor 13 decreases as described before. Accordingly, the collector-emitter voltage of the transistor Q3 and the emitter-collector voltage of the transistor Q10 respectively decrease, and the transistor Q10 is turned ON when the rotational speed of the motor 13 reaches a speed near its steady state rotational speed. When the transistor Q10 is turned ON, the emitter-collector voltage of the transistor Q10 becomes approximately equal to 0.1 [V], and the collector-emitter voltage of the transistor Q3 also becomes approximately equal to 0.1 [V]. As a result, the transistors Q2 and Q3 are turned OFF. Therefore, as the rotational speed of the motor 13 reaches a speed near its steady state rotational speed, only the collector current of the transistor Q10 which is turned ON flows through the motor 13. This collector current of the transistor Q10 which is turned ON, is selected to 100 [mA], for example, which corresponds to the value of the current flowing through the motor 13 during steady state rotation of the motor 13.

Accordingly, if the current amplification of the transistor Q10 is assumed to be equal to 50, the base current $I_{B2}$ of the transistor Q10 during steady state rotation of the motor 13 can be described by the following equation (2).

$$I_{B2} = (1/50) \times 100 \text{ [mA]} = 2 \text{ [mA]} \quad (2)$$

Hence, if sufficient margin is taken into consideration and the base current $I_{B2}$ is set equal to 5 [mA], the resistance of the resistor R12 is selected to 2 [kΩ] (= 10 [V]/5 [mA]). As a result, according to the present embodiment of the invention, the power consumption $P_C$ of the motor 13 upon steady state rotation of the motor 13 can be described by the following equation (3), if the fact that the base current $I_{B1}$ is flowing even when the transistor Q2 is turned OFF is taken into consideration, and the collector-emitter voltage of the transistor Q10 is represented by $V_{CE3}$ and the collector current of the transistor Q10 is represented by $I_C$.

$$P_C = V_B \times (I_{B1} + I_{B2}) + V_{CE3} \times I_C \quad (3)$$
$$= 10 \times (1 + 5) + 0.1 \times 100$$
$$= 70 \text{ [mW]}$$

Figure 2:
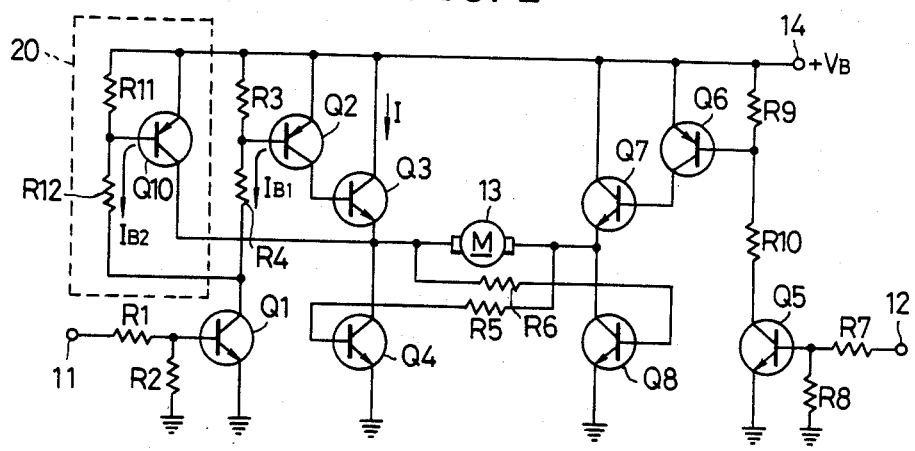
FIG. 2 is a circuit diagram showing a first embodiment of a D.C. motor driving circuit according to the present invention.

On the other hand, in the conventional circuit shown in FIG. 1, the transistors Q2 and Q3 connected in the Darlington pair remain in their ON states during the steady state rotation of the motor 13. Thus, if the collector-emitter voltage of the transistor Q2 in the ON state is represented by $V_{CE1}$ and the base-emitter voltage of the transistor Q3 in the ON state is represented by $V_{BE2}$, the power consumed at the circuit part including the Darlington pair becomes equal to $1 \times (V_{CE1} + V_{BE2})$. Therefore, the power consumption $P_{Ca}$ during the steady state rotation of the motor 13 in the conventional circuit can be described by the following equation (4).

$$P_{Ca} = I_{B1} \times V_B + I \times (V_{CE1} + V_{BE2}) \quad (4)$$

Accordingly, if $I_{B1}$ is equal to 1 [mA], I is equal to 100 [mA], and $V_B$ is equal to 10 [V] as in the above described embodiment, and the collector-emitter voltage $V_{CE1}$ is set equal to 0.1 [V] while the base-emitter voltage $V_{BE2}$ is set equal to 0.7 [V], and these values are substituted into the equation (4) above, the power consumption $P_{Ca}$ during the steady state rotation of the motor 13 becomes equal to 90 [mW] in the conventional circuit. Hence, compared to the conventional circuit shown in FIG. 1, it is possible to reduce the power consumption by 20 (=90−70) [mW] according to the embodiment of the present invention shown in FIG. 2.

As another example of a conventional driving circuit, there was a so-called single-drive circuit in which the transistor Q3 among the transistors Q2 and Q3 connected in the Darlington pair as shown in FIG. 1 is omitted, and the motor 13 is driven solely by the transistor Q2. However, in this conventional circuit, in order to obtain a collector circuit of 1 [A] in the transistor Q2 which is required for starting the motor 13, the base current $I_B$ of the transistor Q2 becomes equal to 20 (=1000/50) [mA]. Thus, if sufficient margin is taken into consideration by flowing a base current of 50 [mA], the power consumption $P_{Cb}$ of the motor 13 during the steady state rotation of the motor 13 in this conventional circuit can be described by the following equation (5) where $I_C$ (=100 [mA]) is the collector current of the transistor Q2 in that state.

$$\begin{aligned} P_{Cb} &= V_B \times I_B + V_{CE1} \times I_C \quad (5) \\ &= 10 \times 50 + 0.1 \times 100 \\ &= 510 \text{ [mW]} \end{aligned}$$

Therefore, as may be seen from the above equation (5), the power consumption of this conventional circuit during steady state rotation of the motor 13 is extremely large. If this conventional circuit is compared with the driving circuit according to the present invention, it may be seen that the power consumption is considerably reduced according to the present invention.

The D.C. motor driving circuit according to the present invention is not limited to the embodiment described heretofore. The circuit part 20 shown in FIG. 2 may be provided with respect to the transistors Q6 and Q7 instead of with respect to the transistors Q2 and Q3. In addition, circuit parts corresponding to the circuit part 20 may also be provided with respect to both the Darlington pairs respectively constituted by the transistors Q2 and Q3 and the transistors Q6 and Q7.

Figure 3:
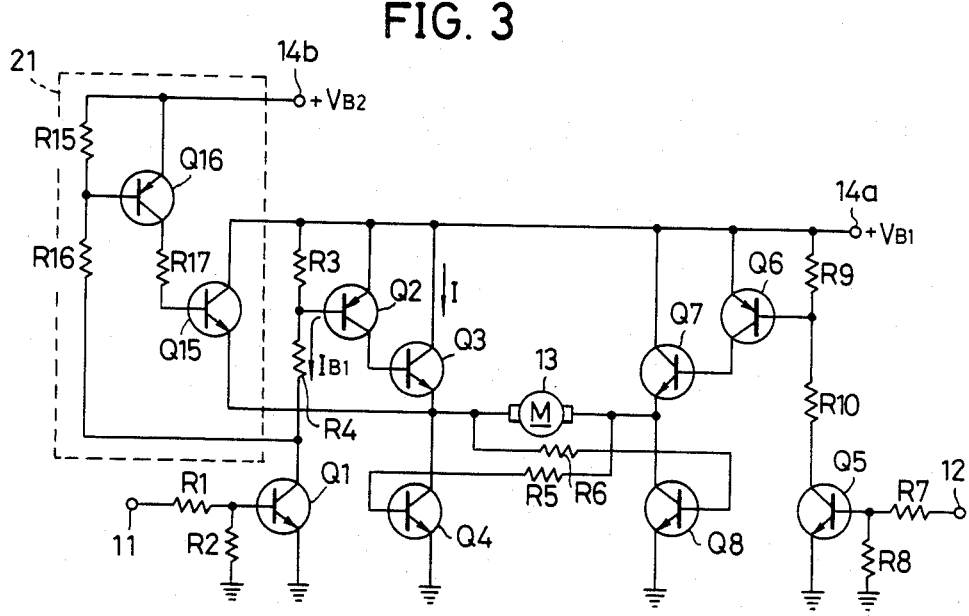
FIG. 3 is a circuit diagram showing a second embodiment of a D.C. motor driving circuit according to the present invention.

Next, description will be given with respect to a second embodiment of a D.C. motor driving circuit according to the present invention, by referring to FIG. 3. In FIG. 3, those parts which are the same as corresponding parts in FIG. 2 are designated by the same reference numerals, and their description will be omitted. According to the present embodiment, two power sources are employed. Thus, a voltage $+V_{B1}$ is applied to a voltage source terminals 14a, and a voltage $+V_{B2}$ is applied to a voltage source terminals 14b, where $+V_{B2}$ is greater than $+V_{B1}$. The transistors Q2 and Q3 and the transistors Q6 and Q7, which are respectively connected in the Darlington pair, are respectively connected to the power source terminal 14a.

A circuit part 21 corresponding to the circuit part 20 shown in FIG. 2, is connected as shown in FIG. 3. The circuit part 21 comprises an NPN type transistor Q15 having its collector connected to the power source terminal 14a and its emitter connected to the motor 13. The transistor Q15 is connected in parallel to the circuit comprising the transistors Q2 and Q3. A PNP type transistor Q16 of the circuit part 21 has its emitter connected to the power source terminal 14b, and its collector connected to the base of the transistor Q15 through a resistor R17. Resistors R15 and R16 are connected in series between the power source terminal 14b and the collector of the transistor Q1. The base of the transistor Q16 is connected to a connection point between the resistors R15 and R16.

In the first embodiment shown in FIG. 2, the base current $I_{B2}$ (2 [mA] to 5 [mA]) of the transistor Q10 flows through the transistor Q1 and is not supplied to the motor 13, making this base current $I_{B2}$ a wasted current. On the other hand, according to the present embodiment, the emitter current of the transistor Q15 is 100 [mA], and the collector current (2 [mA] to 5 [mA]) of the transistor Q16 flows through the base of the transistor Q15. If the current amplification of the transistor Q16 is assumed to be equal to 50, the base current of the transistor Q16 flowing to the transistor Q1 through the resistor R16 is in the range of 10 [μA] to 25 [μA]. Accordingly, according to the present embodiment, the current flowing to the transistor Q15 from the transistor Q16 is supplied to the motor 13 and is not wasted. Moreover, the current flowing to the transistor Q1 from the transistor Q16 is in the range of 10 [μA] to 25 [μA], and is an exceedingly small current. Thus, according to the present embodiment, the wasted power is even smaller than in the first embodiment described before, and the power consumption is considerably small when compared to the conventional circuit.

Further, the present invention is not limited to these embodiments, but various variations and further modifications may be made without departing from the scope of the present invention.

What is claimed is:

1. A D.C. motor driving circuit comprising:
   a first transistor circuit coupled between a D.C. motor and a power source, for supplying a current to said D.C. motor, said first transistor circuit comprising an initial stage transistor and a terminal stage transistor respectively connected in Darlington pair;
   a switching transistor respectively coupled to said initial stage transistor of said first transistor circuit, said switching transistor being turned ON when supplied with a driving signal voltage to put said first transistor circuit in an ON state; and
   a second transistor circuit including a transistor coupled in parallel to said first transistor circuit, for supplying a current to said D.C. motor, said current supplied to said D.C. motor decreasing as the rotational speed thereof increases after starting of said D.C. motor, said first transistor circuit being turned OFF when the rotational speed of said D.C. motor reaches a speed near its constant normal rotational speed, said D.C. motor being supplied with the current from said second transistor circuit during the constant normal rotation thereof.

2. A D.C. motor driving circuit as claimed in claim 1 in which said initial stage transistor is a first PNP type transistor having an emitter coupled to said power source, said terminal stage transistor is a first NPN type transistor having a collector coupled to said power source, a base coupled to the collector of said first PNP type transistor, and an emitter coupled to said D.C. motor, said first transistor circuit further comprises first base biasing resistors coupled to the base of said first PNP type transistor, said transistor of said second transistor circuit is a second PNP type transistor having an emitter coupled to said power source and a collector coupled to the emitter of said first NPN type transistor of said first transistor circuit and said D.C. motor, said second transistor circuit further comprises second base biasing resistors coupled to a base of said second PNP type transistor, and said first and second base biasing resistors of said first and second transistor circuits are respectively coupled to said power source and said switching transistor.

3. A D.C. motor driving circuit as claimed in claim 2 in which said current supplied to said D.C. motor decreases as said D.C. motor starts to rotate, said second PNP type transistor of said second transistor circuit becomes ON when the rotational speed of said D.C. motor reaches a speed near the constant normal rotational speed thereof and an emitter-collector voltage of said second PNP type transistor becomes small, and a collector-emitter voltage of said first NPN type transistor of said first transistor circuit becomes small as the emitter-collector voltage of said second PNP type transistor of said second transistor circuit becomes small, to put said first PNP type and first NPN type transistors of said first transistors circuit OFF.

4. A D.C. motor driving circuit as claimed in claim 2 in which a collector current flowing through said second PNP type transistor of said second transistor circuit in a state where said second PNP type transistor is ON, is selected to a current substantially equal to the current supplied to said D.C. motor during constant normal rotation of said D.C. motor.

5. A D.C. motor driving circuit as claimed in claim 1 in which said power source comprises a first power source and a second power source for supplying a voltage larger than a voltage of said first power source, said initial stage transistor is a first PNP type transistor having an emitter coupled to said first power source, said terminal stage transistor is a first NPN type transistor having a collector coupled to said first power source, a base coupled to the collector of said first PNP type transistor, and an emitter coupled to said D.C. motor, said first transistor circuit further comprises first base biasing resistors coupled to the base of said first PNP type transistor, said transistor of said second transistor circuit is a second NPN type transistor having a collector coupled to said first power source and an emitter coupled to the emitter of said first NPN type transistor of said first transistor circuit and said D.C. motor, said second transistor circuit further comprises a second PNP type transistor having an emitter coupled to said second power source and a collector coupled to the base of said second NPN type transistor, and second base biasing resistors coupled to a base of said second PNP type transistor, said first base biasing resistors of said first transistor circuit are respectively coupled to said first power source and said switching transistor, and said second base biasing resistors of said second transistor circuit are respectively coupled to said second power source and said switching transistor.

* * * * *